(12) United States Patent
Whorton et al.

(10) Patent No.: US 8,090,484 B1
(45) Date of Patent: Jan. 3, 2012

(54) ORIENTATION CONTROL METHOD AND SYSTEM FOR OBJECT IN MOTION

(75) Inventors: Mark Stephen Whorton, Owens Cross Roads, AL (US); John W. Redmon, Jr., Huntsville, AL (US); Mark D. Cox, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 478 days.

(21) Appl. No.: 12/403,096

(22) Filed: Mar. 12, 2009

(51) Int. Cl.
*G05D 1/00* (2006.01)
(52) U.S. Cl. ............... 701/13; 701/4; 244/171.2
(58) Field of Classification Search ........... 701/4, 13; 244/168, 171.2, 171.1
See application file for complete search history.

(56) References Cited

U.S. PATENT DOCUMENTS

| | | | | |
|---|---|---|---|---|
| 3,154,269 A | * | 10/1964 | Musil | 244/34 A |
| 3,200,587 A | * | 8/1965 | Tolson | 60/232 |
| 4,747,567 A | * | 5/1988 | Johnson et al. | 244/172.6 |
| 5,133,518 A | * | 7/1992 | Flament | 244/168 |
| 5,630,564 A | * | 5/1997 | Speicher et al. | 244/3.24 |
| 5,887,821 A | * | 3/1999 | Voigt et al. | 244/52 |
| 6,053,455 A | * | 4/2000 | Price et al. | 244/169 |
| 7,913,953 B2 | * | 3/2011 | Ellinghaus | 244/159.6 |
| 2005/0274849 A1 | * | 12/2005 | Klosner et al. | 244/171.5 |

* cited by examiner

*Primary Examiner* — Paul N Dickson
*Assistant Examiner* — Timothy Wilhelm
(74) *Attorney, Agent, or Firm* — Peter J. Van Bergen; James J. McGroary

(57) ABSTRACT

An object in motion has a force applied thereto at a point of application. By moving the point of application such that the distance between the object's center-of-mass and the point of application is changed, the object's orientation can be changed/adjusted.

6 Claims, 4 Drawing Sheets

ORIENTATION CONTROL METHOD AND SYSTEM FOR OBJECT IN MOTION

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to control of an object's orientation. More specifically, the invention is a method and system for controlling orientation of an object in motion.

2. Description of the Related Art

Objects in motion typically can be described in terms of their translational motion and rotational motion. In simple terms, translational motion refers to an object's motion along its velocity vector while rotational motion places the object in an orientation relative to its velocity vector. Objects experiencing this type of motion range from non-powered objects (e.g., bullets) to powered objects (e.g., vehicles such as aircraft, spacecraft, underwater vehicles, etc.). Sometimes an object's orientation must be changed independently of the object's translational motion. Traditionally, orientation is changed by a thrust producing device mounted on the object. The thrust producing device is either throttled and/or gimbaled in position such that the produced thrust causes a desired amount of rotational motion.

Other known devices used to control rotational motion are control movement gyro assemblies and/or reaction wheels. More recently, in the field of space travel, multiple solar sails have been devised to generate propulsive thrust and/or re-orient the spacecraft. However, most of these devices either require fuel, are heavy, or are realized by relatively complex mechanisms and/or control systems.

SUMMARY OF THE INVENTION

Accordingly, it is an object of the present invention to provide a method and system for controlling orientation of an object in motion.

Another object of the present invention is to provide a simplified approach for the control of rotational motion/orientation of a moving vehicle.

Other objects and advantages of the present invention will become more obvious hereinafter in the specification and drawings.

In accordance with the present invention, a method and system are provided for controlling orientation of an object in motion. It is assumed that the object is in motion with the motion being at least partially induced by a force applied thereto at a point of application. By moving the point of application such that the distance between the object's center-of-mass and the point of application is changed, the object's orientation can be changed/adjusted.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
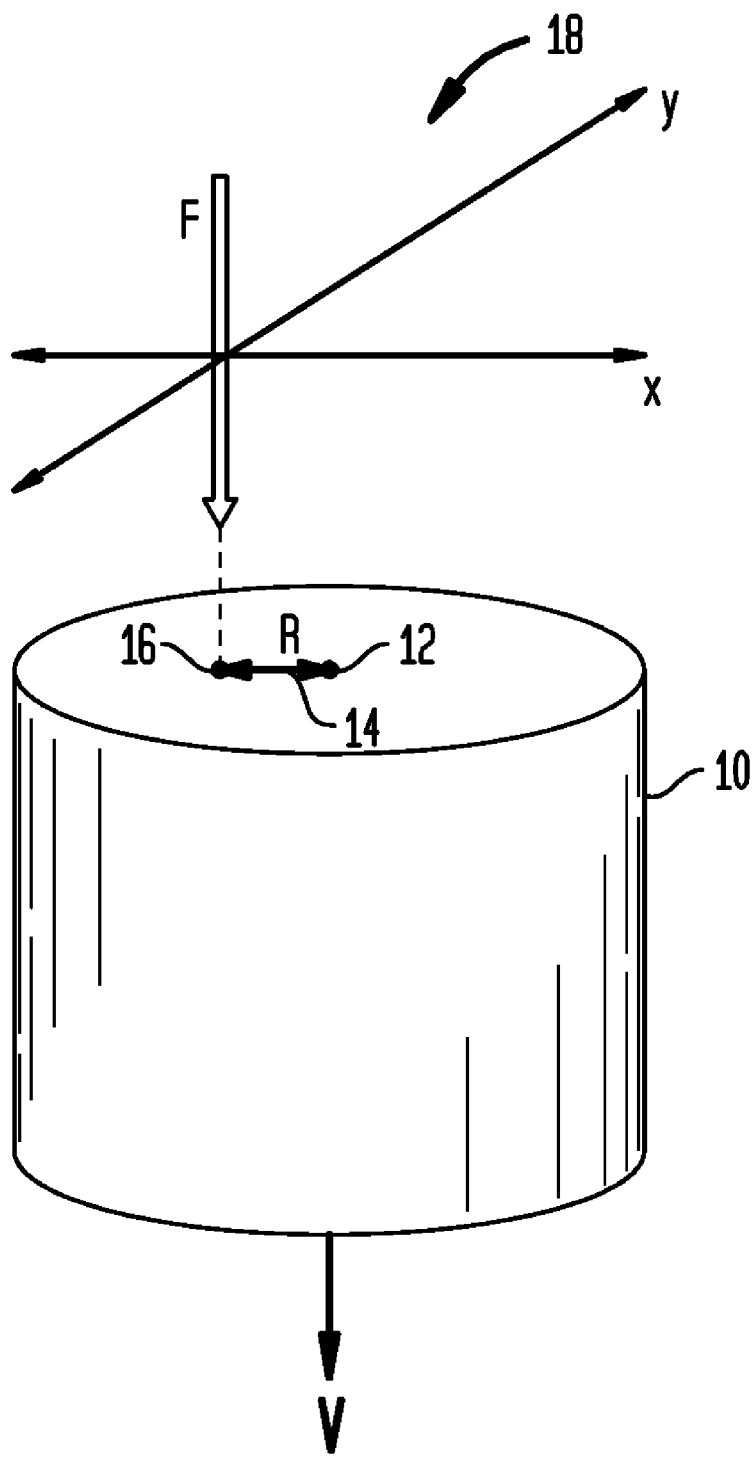
FIG. 1 is a diagrammatic view illustrating orientation control of an object in motion in accordance with the present invention.

Referring now to the drawings and more particularly to FIG. 1, an object in motion is referenced by numeral 10. Object 10 is indicative of any powered or non-powered object, system, vehicle, etc., that is experiencing translational motion along a velocity vector V. Accordingly, the illustrated shape of object 10 is merely for purpose of description and is not a limitation of the present invention.

The velocity V of object 10 can be constant or dynamic (i.e., accelerating or decelerating) and oriented in any direction without limiting the present invention.

The orientation of object 10 relative to its velocity vector V is controlled in the present invention by varying the length R of a moment arm 14 defined between the object's center-of-mass 12 and an application point 16 of a force F. For purposes of the present invention, force F is a resultant force that can be a component of a larger force used to generate velocity V, or can be its own applied or generated force used solely to change orientation of object 10. The orientation of object 10 is controlled by the torque generated by the resultant force F and moment arm 14 (i.e., F×R). In conventional approaches, torque and orientation are controlled by modulating (or throttling) force F. However, the present invention applies the novel approach of modulating R as the sole or additional means to modulate torque to change the orientation of object 10. More specifically, the present invention changes application point 16 of force F in order to change the applied torque and thereby change orientation of object 10. By doing this, the present invention can avail itself of uncontrollable generators of force F (i.e., constant-magnitude force generators, environmentally-powered force generators, etc.).

Briefly, the present invention changes R by changing the application point 16 to thereby change R. That is, the present invention moves force F in one, two or three dimensions to change R. By way of a non-limiting and simple illustration, the present invention will be explained for a two-dimensional change in R caused by translating force F in one or both of the two dimensions defined by an x-y plane 18.

Force F can be, but need not be, perpendicular to plane 16.

As mentioned above, a great advantage of the present invention is ability to use simple, constant-magnitude force generators (e.g., rocket thrusters) in an orientation control system. That is, complex throttling systems and schemes can be eliminated and replaced with simple translator mechanisms.

However, it is to be understood that the present invention is not so limited as the methods/system described herein could also be used to augment an orientation control system using throttling thrusters. Furthermore, the present invention lends itself to use with environmentally-powered force generators such as wind energy, wave energy, or solar energy collectors. That is, the present invention can be used to adjust length R of moment arm 14 in conjunction with environmentally-created force F to affect orientation control. While these force generators may not be as predictable as constant-magnitude force generators, they do not require an on-board fuel source for operation thereby making them ideal candidates for objects designed for long-duration travel.

The x-y planar translation (or three-dimensional movement) of force F can be realized in a variety of ways without departing from the scope of the present invention. By way of example, an embodiment of an x-y translator will be described with simultaneous reference to FIGS. 2 and 3 where the entire x-y translator 100 is illustrated in FIG. 2 and an isolated view of the translator's motor and linear bearing housing 200 is illustrated in FIG. 3.

Figure 2:
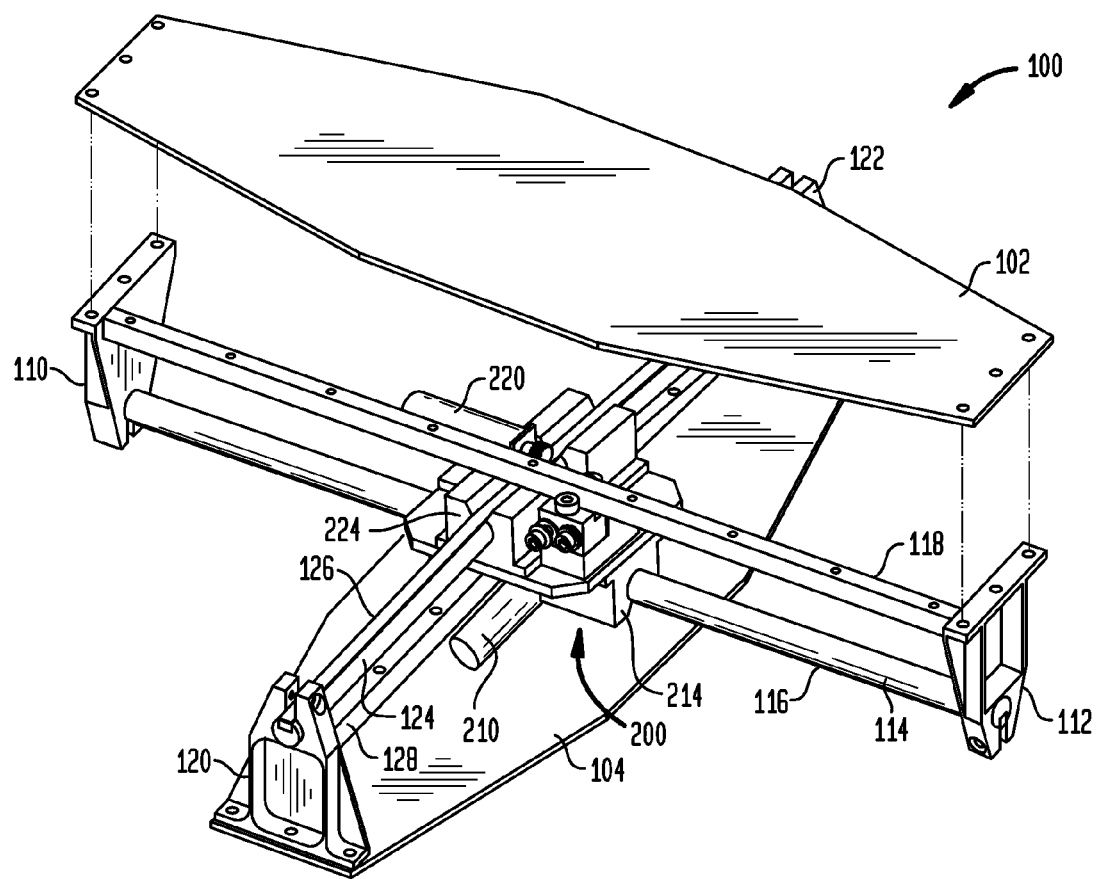
FIG. 2 is a perspective and partially exploded view of an x-y translator in accordance with an embodiment of the present invention.

Referring first to FIG. 2, x-y translator 100 includes opposing bases or mounting plates 102 and 104. For clarity of illustration, base 102 is exploded with respect to the remainder of x-y translator 100. Mounting plate 102 serves as a base support for an object (e.g., object 10 in FIG. 1) that will undergo translational motion along a velocity vector. Mounting plate 104 serves as a base support for a force collector or generator that will apply the orientation controlling force to the object mounted to mounting plate 102. The particular size/shape of mounting plates 102 and 104 are not limitations of the present invention. In the illustrated example, mounting plate 102 has end brackets 110 and 112 depending therefrom for the rigid support of a guide rail 114 having a rack gear 116 defined along a substantial portion of the length thereof. Similarly, mounting plate 104 has end brackets 120 and 122 depending therefrom for the rigid support of a guide rail 124 having a rack gear 126 defined along a substantial portion of the length thereof. For reasons that will be explained further below, each of mounting plates 102 and 104 includes a linear rotational restraint rib 118 and 128, respectively, extending along its underside and parallel to the guide rail associated with the particular mounting plate.

Mounting plates 102 and 104 are positioned and maintained in parallel planes and in a perpendicular orientation relationship by translator motor and linear bearing housing 200. More specifically and with additional reference to FIG. 3, guide rails 114 and 124 are indexed to and can slide within perpendicularly-oriented linear bearings 214 and 224, respectively, such that rack gears 116 and 126 engage gears coupled to respective drive motors 210 and 220.

Figure 3:
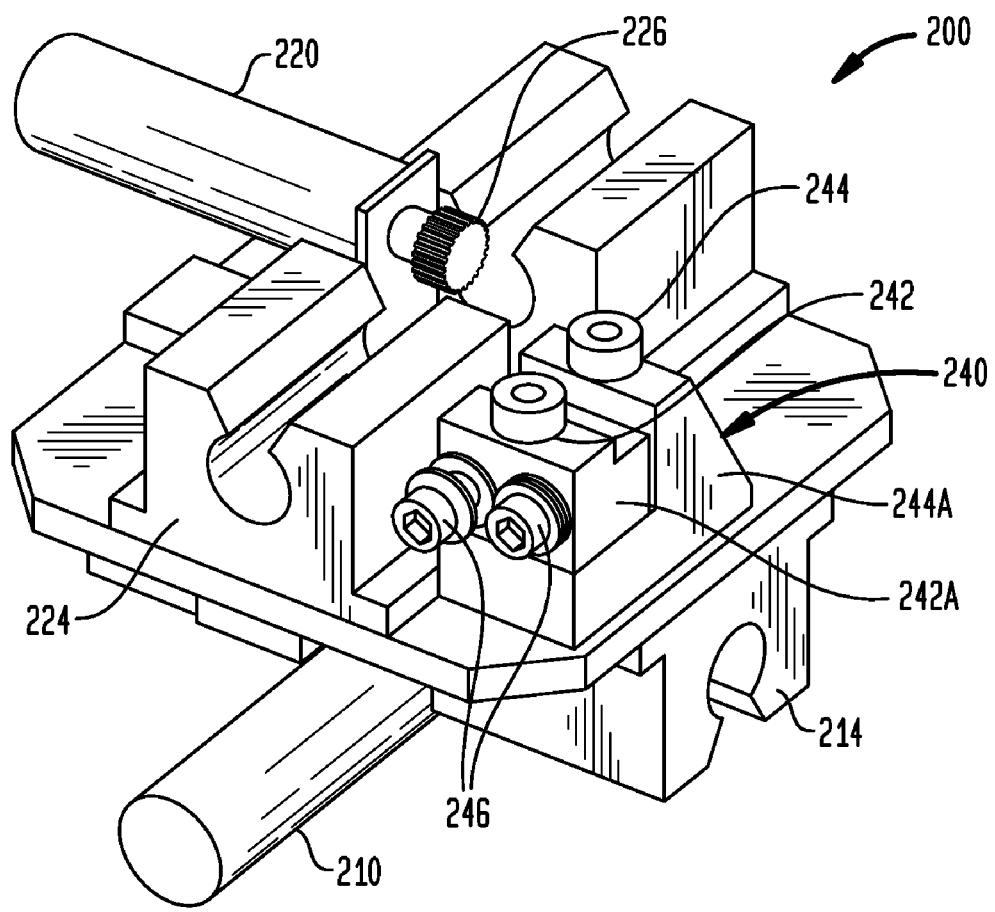
FIG. 3 is an isolated perspective view of an embodiment of a motor and linear bearing housing for the x-y translator.

In FIG. 3, only gear 226 coupled to drive motor 220 is visible. However, it is to be understood that a corresponding gear would be coupled to drive motor 210 as would be understood by are of ordinary skill in the art.

Mounted adjacent each of linear bearings 214 and 224 is a respective rotational restraint assembly designed to cooperate with the rotational restraint rib provided on the underside of mounting plate 102 and mounting plate 104. In FIGS. 2 and 3, only the rotational restraint assembly 240 cooperating with rib 118 is visible. However, it is to be understood that an identical rotational restraint assembly (not visible in FIGS. 2 and 3) is provided to cooperate with rib 128. Restraint assembly 240 has rolling elements 242 and 244 that will be disposed on either side of and engage rib 128 of mounting plate 104. The positions of a restraint's rolling elements can be adjustable or spring-biased towards the respective rib in order to accommodate small variations in rib dimensions as would be understood by one of ordinary skill in the art. For example, each rolling element can be mounted to a block (e.g., block 242A and 244A for assembly 240 as illustrated in FIG. 3) with the blocks being positioned by adjustment screws (e.g., adjustment screws 246 for assembly 240).

In operation, one or both motors 210 and 220 are operated to reposition the force collector/generator coupled to mounting plate 104. That is, operation of motor 210 causes movement in an x-dimension while operation of motor 220 causes movement in a y-dimension. This movement is controlled to reposition a resultant orientation-controlling force to the object coupled to mounting plate 102. As described above, this force is applied such that there is a distance between the application of the force and the object' (coupled to plate 102) center-of-mass.

Figure 4:
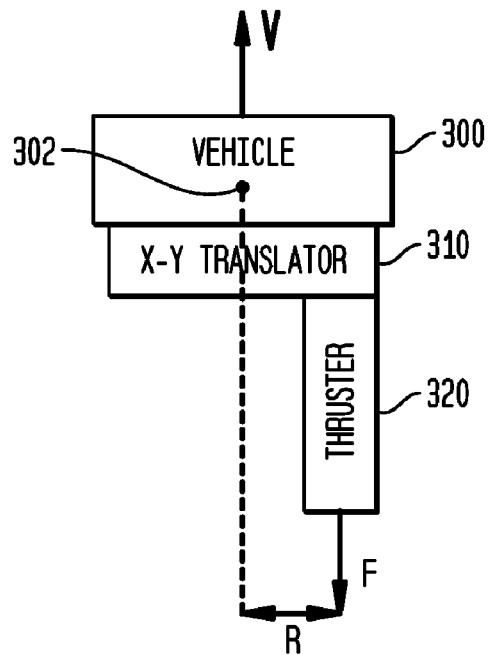
FIG. 4 is a side schematic view of vehicle using a constant-magnitude thruster in accordance with an embodiment of the present invention.

FIG. 4 illustrates a schematic view of a constant-magnitude thruster vehicle-orientation-control embodiment of the present invention. A vehicle 300 having a center-of-mass 302 is assumed to be experiencing translational motion along velocity vector V. An x-y translator 310 is coupled directly or indirectly to and between vehicle 300 and a thruster 320.

It is to be understood that thruster 320 can be a constant-magnitude or variable-magnitude thruster capable of generating a force F when activated. Translator 310 is operated to control the length R of the moment arm defined between center-of-mass 302 and the application point of force F.

Figure 5:
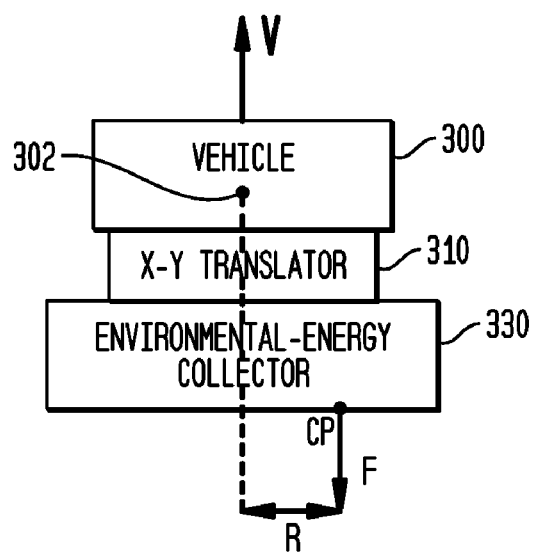
FIG. 5 is a side schematic view of a vehicle using a force collector in accordance with another embodiment of the present invention.

FIG. 5 illustrates a schematic view of another vehicle-orientation-control embodiment of the present invention where an environmental-energy collector 330 is coupled directly or indirectly to translator 310. For example, collector 330 can be a vehicle fin or a solar sail. In the case of a solar sail, a resultant force F is generated at a center-of-pressure CP on the sail that is located a distance R (i.e., the length of a moment arm) from the vehicle's center-of-mass 302. Methods for determining the location of center-of-pressure CP for given environmental conditions are well understood in the art.

The advantages of the present invention are numerous. Orientation control of an object in translational motion is readily controlled for constant-magnitude, variable-magnitude, or uncontrollable orientation-control force generators. The approach can be adapted for use in a wide variety of vehicles operating in a wide variety of environments. The present invention is well-suited for use in vehicle travel where the vehicle can make use of environmental forces (e.g., wind, atmospheric drag on a fin, solar energy acting on a solar sail and/or wave energy acting on a fin of a waterborne vehicle) for the generation of translational and/or rotational motion.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for controlling rotational orientation of an object experiencing translational motion along a velocity vector, comprising:

an x-y translator having a first base assembly, a second base assembly, and a translating assembly, said first base assembly including (i) a first base, (ii) a first linear rib coupled to said first base, and (iii) a first guide rail coupled to, spaced apart from, and parallel to said first linear rib, said second base assembly including (i) a second base, (ii) a second linear rib coupled to said second base, and (iii) a second guide rail coupled to, spaced apart from, and parallel to said first linear rib, said translating assembly coupled to said first linear rib, said first guide rail, said second linear rib, and said second guide rail, said translating assembly independently moving said first guide rail in a first dimension wherein said first base correspondingly moves in a first plane, said translating assembly independently moving said second guide rail in a second dimension that is perpendicular to said first dimension wherein said second base correspondingly moves in a second plane, and wherein said translating assembly maintains said first plane parallel to said second plane, said first base adapted to be coupled to an object experiencing translational motion; and means coupled to said second base for generating a force displaced from the object's center-of-mass wherein a moment arm is created to control rotational orientation of the object.

2. A system as in claim 1 wherein said means comprises a collector for passively receiving energy associated with said force.

3. A system as in claim 1 wherein said means is selected from the group consisting of a solar sail and a vehicle fin.

4. A system as in claim 1 wherein said means comprises a thruster for actively producing said force.

5. A system as in claim 4 wherein said thruster is a constant-magnitude thruster.

6. A system as in claim 1, wherein said translating assembly constrains said first linear rib to movement in said first dimension, and constrains said second linear rib to movement in said second dimension.

\* \* \* \* \*